United States Patent
Rakos et al.

(10) Patent No.: US 9,717,025 B2
(45) Date of Patent: Jul. 25, 2017

(54) METHOD AND APPARATUS FOR MANAGING NEIGHBOUR RELATIONS

(75) Inventors: Attila Rakos, Székesfehérvár (HU); Peter Szilagyi, Debrecen (HU); Csaba Vulkan, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 13/982,283

(22) PCT Filed: Jan. 31, 2011

(86) PCT No.: PCT/EP2011/051291
§ 371 (c)(1),
(2), (4) Date: Jul. 29, 2013

(87) PCT Pub. No.: WO2012/103918
PCT Pub. Date: Aug. 9, 2012

(65) Prior Publication Data
US 2013/0310044 A1    Nov. 21, 2013

(51) Int. Cl.
*H04W 36/08* (2009.01)
*H04W 36/00* (2009.01)
*H04W 24/02* (2009.01)

(52) U.S. Cl.
CPC ... *H04W 36/0083* (2013.01); *H04W 36/0061* (2013.01); *H04W 36/08* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 6,505,043 B1 * | 1/2003 | Aihara | 455/436 |
| 2003/0190916 A1 | 10/2003 | Celedon et al. | |
| 2009/0264130 A1 * | 10/2009 | Catovic et al. | 455/436 |
| 2009/0318144 A1 | 12/2009 | Thomas et al. | |
| 2010/0173631 A1 * | 7/2010 | Kim et al. | 455/436 |

(Continued)

FOREIGN PATENT DOCUMENTS

CN    101415212 A1    4/2009
EP    2134120 A1    12/2009

(Continued)

OTHER PUBLICATIONS

International Search Report and Written Opinion dated Oct. 31, 2011 corresponding to International Patent Application No. PCT/EP2011/051291.

(Continued)

*Primary Examiner* — Olumide T Ajibade Akonai
*Assistant Examiner* — Margaret G Mastrodonato
(74) *Attorney, Agent, or Firm* — Squire Patton Boggs (US) LLP

(57) ABSTRACT

A method of managing neighbour relations between cells in a cellular communication system comprising the steps of: receiving requests (350) for admission of a neighbour relation by an admission policy block (310) having a leaky bucket maintained in respect of that neighbour relation; adding tokens in respect of each request to the leaky bucket; removing tokens from the leaky bucket as time passes; and admitting the neighbour relation (320) if the number of tokens passes a threshold.

11 Claims, 6 Drawing Sheets

(56) References Cited

U.S. PATENT DOCUMENTS

Figure 1:
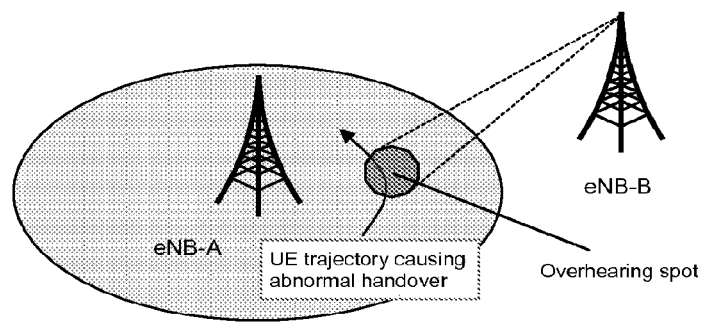

2010/0304743 A1    12/2010  Jung et al.
2013/0165120 A1*  6/2013  Nylander ................ H04W 8/08
                                                                          455/436

FOREIGN PATENT DOCUMENTS

GB          2331892 A    6/1999
WO    WO 98/36588 A2    8/1998

OTHER PUBLICATIONS

Ed A. S. Tanenbaum, "Computer Networks, 4th Edition," Jan. 1, 2003, Computer Networks, XP002661248, pp. 400-402.
Office Action dated Dec. 3, 2015, issued in corresponding CN patent application No. 201180066439.9 (English translation only).

* cited by examiner

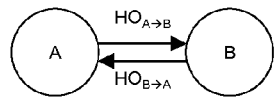
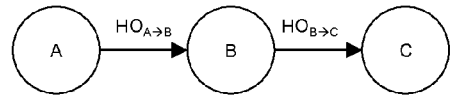
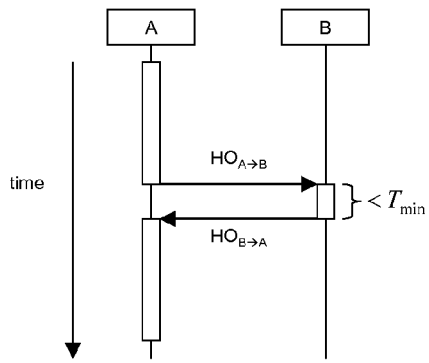
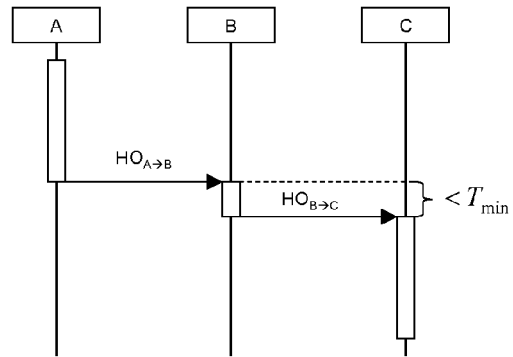
Figure 5(a).
Figure 5(b).
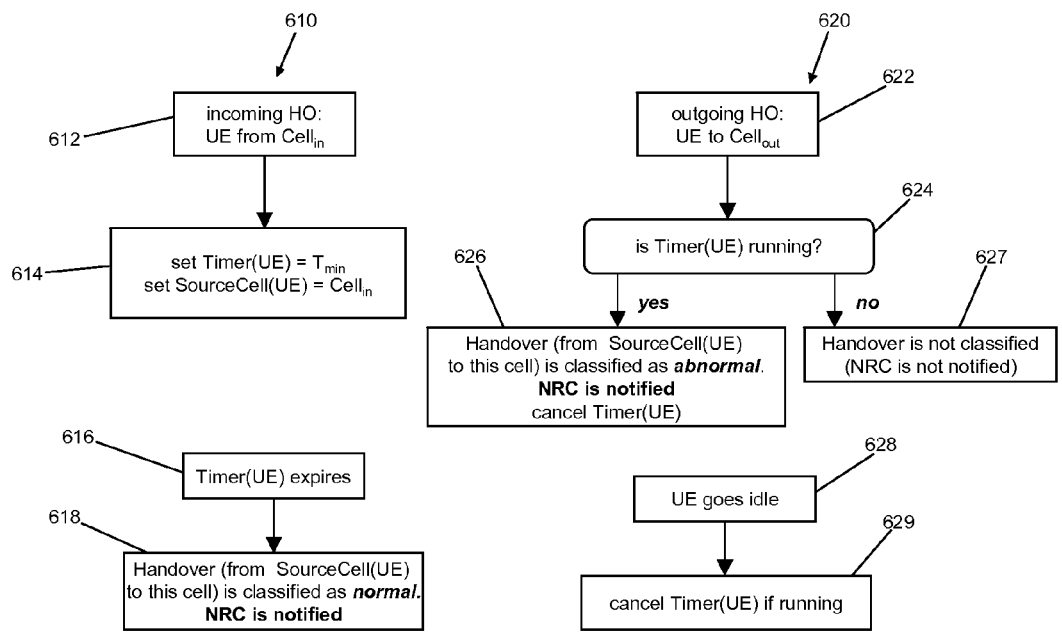
Figure 6.

METHOD AND APPARATUS FOR MANAGING NEIGHBOUR RELATIONS

This invention relates to managing neighbor relations. It is particularly, but not exclusively, related to managing neighbor relations in a cellular communications system.

Communications systems capable of providing communications to mobile terminals are now well-known and well-used. Many such systems operate by providing base stations and/or access points spread over an area over which mobile communications are to be provided. One useful capability of such systems is the ability of a mobile terminal to have continuity of service as it travels from a first location in which it is being served by a first base station or access point to a second location in which it is then served by a second base station or access point.

Such continuity of service may be provided by handovers (HOs) between adjacent areas referred to as cells. A base station or an access point may serve one cell or a number of cells and there can be handovers: between neighboring base stations, between parts of the same base station, between neighboring access points, and between a base station and a neighboring access point. In this document, the term "base station" will be used to refer both to base stations and access points.

In order to provide efficient network operation, relationships between neighboring base stations need to be defined. In particular, it may be useful for a base station to be aware of neighboring base stations and those base stations with which it may communicate and/or conduct a handover operation.

There are a number of different kinds of cellular mobile communication systems. Following an initial analogue first generation system, the subsequent digital systems are referred to as second, third, and fourth generation systems. Respective examples of digital systems are GSM (Global System for Mobile Communications), UMTS (Universal Mobile Telecommunication System), and LTE (Long Term Evolution). Controlling relationships between neighboring base stations has been a feature of all of these digital systems. Referring to LTE in particular, such control can be achieved by using an Automatic Neighbor Relation (ANR) feature which is concerned with the automation of establishment, maintenance, and removal of Neighbor Relation (NRs). In the context of LTE systems, NRs are cell-to-cell relations with attributes for controlling handover between related cells provided by neighboring eNodeBs (eNBs) and for carrying out set-up of connections between the eNBs hosting the cells enabling the eNBs to communicate directly with each other (referred to as X2 connections). It should be noted that NRs themselves are unidirectional relations, and X2 connections between eNBs are bidirectional relations.

An ANR function running in an eNB supports the establishment of NRs based on reports from mobile terminals. A mobile terminal may be referred to as a User Equipment (UE). If a UE notifies its serving eNB about a cell that is not yet known to that eNB, for example in a measurement report indicating a list of base stations, an ANR functionality in the eNB will create a new NR with respect to such a newly reported cell, with the newly reported cell as target. The NR may define the interactions between the eNB and its newly reported neighbor as follows:

noHO attribute: disables handover from a source cell to the target cell;
noX2 attribute: disables setup of the X2 connection between the eNBs of the source and target cell; and
noRemove attribute: prohibits the removal of the NR by the ANR functionality of the eNB.

These attributes are assigned to a particular NR in a database called a Neighbor Relation Table (NRT).

The noRemove attribute can be used to over-rule a Neighbor Removal Function that, otherwise, may cause NRs for which no UE measurement report has been received for a while to "age", eventually removing them when the NR has become sufficiently "old".

Although the ANR function delivers a convenient way to manage NRs, it is not the only means by which they can be established. In addition to establishment by the ANR function, NRs can also be established based on a trigger from an Operations, Administration, and Maintenance (OAM) system. For example, a newly deployed eNB is likely to be configured via the OAM system with initial NRs that are considered to be necessary, usually based on a cell coverage area assessment carried out during a network planning stage. Following an eNB being first switched on, its ANR functionality may create additional NRs or remove some of the ones supplied by the OAM system during the operational lifetime of the eNB.

NRs of an eNB are stored in the NRT contained within the eNB. It contains the target cell with which the eNB containing the NRT is considered to have a relationship rather than the eNB serving the target cell because an eNB can host multiple cells (typically three) and NRs relate to cells. In respect of an NR, the NRT also contains the attributes of the NR such as those referred to in the foregoing.

ANR provides a method for eNBs to discover cells in their neighborhood in an automated way, based on mobile terminal measurement reports, for example of received signal strength. The reports that trigger the NR establishment by the ANR function are based on LTE event measurements. An A3 event (that is the signal of a neighbor cell is better in terms of a certain threshold than that of a serving cell) has been proposed as a trigger for ANR because the event implies that a mobile terminal resides in a location which receives overlapping coverage by (at least) two cells. Therefore, it is considered to be a good idea to make those cells neighbors by means of establishing an NR and a corresponding X2 connection between the eNBs (assuming that this has not already been done). The philosophy behind this approach (and, by extension, behind ANR in general) is to assume that overlapping cells will usually lead to handovers which in turn require X2 connections directly between the cells or require an S1-based connection via the core network.

There are problems with the current ANR operation. For example, only one UE measurement report is enough to trigger a complete X2 setup (as part of creating an NR), which may be a waste of resources if it is just a result of an unusual radio propagation effect, and subsequently no (or very few) mobile terminals would actually use the NR for handover.

Adding a new NR and establishing an X2 connection also has an impact on aggregation and transport networks. This can lead to an increase in operating expenditure (OPEX) for a network operator. Due to increased traffic that has to be carried by a transport network, the network operator may need to increase link budget allocations and, consequently, extend Service Level Agreements (SLAs) or acquire additional leased lines.

Handover is a basic functionality supporting UE mobility between cells. Completing a handover consists of both control plane (HO preparation, HO completion) and user plane (X2 traffic forwarding) procedures, which use the transport network of the LTE system to convey the necessary control messages and user data between participating entities. Usually, the extra traffic and resource utilisation introduced by the handover procedures is marginal compared to the traffic normally generated or received by mobile terminals in a cell. However, if handovers become unreasonably frequent between cells, the extra traffic and load may become significant and deteriorate the overall performance of the LTE system in the cells that suffer from increased HO frequency. This may trigger extensive signalling of call establishment teardown as well as continuous disruption to transport traffic. If such handovers are between cells that provide connection via different gateways or are otherwise separated in the transport network, the potential disruption may be greater. It may even affect cells having a normal frequency of handovers but sharing the same transport network resources with those having increased handover incidences, thus causing congestion or delays.

Increased HO traffic that is not a result of correspondingly increased UE mobility may be a sign of unusual radio propagation conditions or problematic cell coverage. The more frequent the handovers, the greater the extra load they cause. Therefore, it is undesirable for mobile terminals to be rapidly handed over to a second cell after they have just arrived in a first. This may be manifested by a mobile terminal being handed over to another cell but very shortly afterwards being handed back to the original cell, resulting in a "ping-pong" effect. Alternatively, the mobile terminal may be circularly handed over around a number of cells before arriving back at an original cell.

It should be noted that such handovers cannot necessarily be prevented from occurring by properly adjusting cell-specific handover trigger and hysteresis parameters, which are usually effective against "ping-pong" effects experienced by mobile terminals moving along cell edges. Abnormal handovers may still be justified from the perspective of prevailing radio parameters, meaning that the mobile terminals really have entered an area where another cell has much better signal reception than their serving cell. Such "overhearing" spots may be due to unusual radio propagation conditions and not be part of "planned" cell borders. An example of this is shown in FIG. 1. In this Figure, within a cell provided by a base station eNB-A, there is an overhearing spot in which radio parameters indicate that there is a small localised patch where another cell, that is containing an adjacent or non-adjacent base station eNB-B, appears to offer a better wireless connection than the cell provided by the base station eNB-A. As a result, if a mobile terminal has a trajectory through its serving cell by which it passes through the overhearing spot, there may be a handover from eNB-A to eNB-B. Discovering all overhearing spots is difficult to carry out in practice.

Another example of a situation in which such handovers can occur is when cells are placed along the sides of a river. Due to relatively effective radio propagation in water, mobile terminals moving along the riverside may be handed over for very short periods of time to a further cell (either on the same side of the river or on the opposite side) if the signal of the serving cell weakens (for example because of sudden shadowing caused by a building).

The problems mentioned in the foregoing may lead to significant extra traffic and load on a transport network.

According to a first aspect of the invention there is provided a method of managing neighbor relations between cells comprising the steps of:
receiving requests for admission of a neighbor relation;
adding tokens in respect of each request;
removing tokens as time passes; and
admitting the neighbor relation if the number of tokens passes a threshold.

Preferably, there is one addition step of one or more tokens in respect of each request.

Preferably, the method is applied in an admission policy block. It may be applied in a base station, for example in an eNodeB.

Preferably, passing the threshold means that the case for adding a new neighbor relation is met in terms of demand.

Preferably, admitting the neighbor relation involves creating the neighbor relation. It may involve creating a neighbor relation in a neighbor relation table.

Preferably, the requests are made in respect of cells which are candidates to be associated with a neighbor relation. Measurement reports in respect of at least one air interface characteristic can be considered as requests for adding a neighbor relation.

Preferably, receipt of a measurement report identifying a cell for which a neighbor relation has not been established leads to adding predefined numbers of tokens in respect of that cell. The number of tokens added following handling of a measurement report may reflect a weight given to the source of the measurement report. It may reflect a subscriber status or class. Measurement reports may be differentiated according to the grade of a subscription and weighted accordingly.

Preferably, in order to decide to admit the neighbor relation, there is an additional assessment. This may be a sanity check. This may involve evaluating a candidate neighbor relation in order to determine whether it will, actually, be created. The sanity check may evaluate criteria relating to the neighbor relation being between a macro and a micro/pico cell and/or relating to transport network considerations. The transport network considerations may represent a distance or cost. A high distance or cost may lead to a refusal to add a neighbor relation candidate. It may lead to a transport network optimisation or reconfiguration to bring the neighbors of a neighbor relation closer together in terms of transport network cost.

Preferably, tokens are added to a leaky bucket. There may be a leaky bucket maintained separately for each neighbor relation candidate.

According to a second aspect of the invention there is provided a method of managing neighbor relations between cells comprising the steps of:
classifying handovers associated with a neighbor relation between cells into classifications of a first type and classifications of a second type;
adding tokens in respect of the classifications of the first type to create a first sum of tokens, removing tokens from the first sum of tokens as time passes, and monitoring the sum of tokens with respect to a first threshold;
adding tokens in respect of the classifications of the second type to create a second sum of tokens, removing tokens from the second sum of tokens as time passes, and monitoring the sum of tokens with respect to a second threshold; and
determining a state of the neighbor relation according to the relative levels of the first and second sums of tokens and their respective thresholds.

Preferably, the method is applied in an ANR function. It may be applied by a handover classification block and a neighbor relations classifier block. It may be applied in a base station, for example in an eNodeB.

Preferably monitoring the sums of tokens with respect to the first and second thresholds provides a sub-state of the neighbor relation.

Preferably, as a result of determining a particular state of a neighbor relation, the neighbor relation may be modified. It may be modified in a neighbor relation table of a base station. This may be in a base station other than the one in which the method is carried out.

Preferably, the determined state of the neighbor relation is used to modify an existing neighbor relation.

Preferably, classifying handovers provides information about a particular handover to a cell whether it is desirable from a system point of view. Classification may determine whether, for each incoming handover, it is normal or abnormal. A handover classification may be mapped to a corresponding neighbor relation in order to make decisions about it.

Preferably, the rate of removal of tokens may be set based on the measured rate at which requests are received in respect of a cell. It may be based on a distance measure in a transport network.

Preferably, each incoming and outgoing handover may be monitored at a given cell. There may be a determination made, in respect of incoming handovers, whether they are normal or abnormal. This may involve comparing an actual period of occupancy in a cell with a minimum period.

Preferably, handovers are classified by a handover classification block. The handover classification block may classify individual handovers rather than neighbor relations.

Preferably, neighbor relations are assessed by a neighboring relation classification block. This block may decide whether an existing neighbor relation is desirable. Neighbor relation classification may be based on handover classification. The neighbor relations classified at a cell may be those that enable incoming handovers to the cell.

Preferably, the first and second sums of tokens are maintained in respect of each neighbor relation.

Preferably, tokens are added to a first leaky bucket and to a second leaky bucket.

Preferably, the first sum of tokens may be incremented if a handover is classified as normal and the second sum of tokens may be incremented if a handover is classified as abnormal.

A number of states may be monitored depending on combinations of the relative conditions of each sum of tokens with respect to its corresponding threshold. There may be four states. There may be an acceptable state. There may be a neutral state. There may be an undesirable state. Each state may result in a respective action, which is performed when a state change is realised. The respective action may be to not take any action. Actions may be applied to attributes of a neighbor relation.

In one embodiment of the invention, in the event that an action is to be applied to attributes of a neighbor relation, this is carried out automatically. This may occur by a manager entity contacting an agent entity of a cell which maintains the neighbor relation and instructing it to modify the neighbor relation.

In one embodiment of the invention, a state requiring neighbor relation modification may lead to a notification being sent so that a receiving entity may take appropriate action, for example manually.

The action may be blacklisting a neighbor relation. Blacklisting might be applied so that the neighbor relation is not used until network optimisation and/or modifications can be carried out.

Preferably, the first and/or second thresholds depend on the overall rate of handovers. In one embodiment, the rate of tolerated abnormal handovers may increase with increasing overall rate of handovers.

The first or second sums of tokens may decrease exponentially in time.

Preferably, in respect of incoming handovers, for each incoming handover, a count-down timer starts. The timer may expire without a further handover in which case an incoming handover may be classified as normal.

Preferably, in respect of an outgoing handover, it is checked whether a timer for the corresponding mobile terminal is running. If it is, then a preceding incoming handover for the mobile terminal may be classified as abnormal. If it is not, then no "classification on outgoing handover" needs to be made.

Preferably, if a mobile terminal goes idle before its timer expires, its timer may be cancelled. In this case, the corresponding incoming handover may not be classified.

A method according to the invention may be carried out to make sure there is a reasonable demand for a neighbor relation either in terms of its creation, in terms of its maintenance, or both.

Preferably, the method is applied in a communications system. It may be applied in a cellular communications system.

According to a third aspect of the invention there is provided a communication system comprising a plurality of nodes, the nodes being capable of managing neighbor relations between cells and comprising:

an input capable of receiving requests for admission of a neighbor relation;

an admission management block capable of adding tokens in respect of each request and removing tokens as time passes, the admission management block admitting the neighbor relation if the number of tokens passes a threshold.

According to a fourth aspect of the invention there is provided a communication system comprising a plurality of nodes, the nodes being capable of managing neighbor relations between cells and comprising:

a classification block capable of classifying handovers associated with a neighbor relation between cells into classifications of a first type and classifications of a second type;

a first token handling entity capable of adding tokens in respect of the classifications of the first type to create a first sum of tokens, removing tokens from the first sum of tokens as time passes, and monitoring the sum of tokens with respect to a first threshold;

a second token handling entity capable of adding tokens in respect of the classifications of the second type to create a second sum of tokens, removing tokens from the second sum of tokens as time passes, and monitoring the sum of tokens with respect to a second threshold;

wherein the classification block is capable of determining a state of the neighbor relation according to the relative levels of the first and second sums of tokens and their respective thresholds.

According to a fifth aspect of the invention there is provided a node capable of managing neighbor relations between cells comprising:

an input capable of receiving requests for admission of a neighbor relation;

an admission management block capable of adding tokens in respect of each request and removing tokens as time passes, the admission management block admitting the neighbor relation if the number of tokens passes a threshold.

According to a sixth aspect of the invention there is provided a node capable of managing neighbor relations between cells comprising:
a classification block capable of classifying handovers associated with a neighbor relation between cells into classifications of a first type and classifications of a second type;
a first token handling entity capable of adding tokens in respect of the classifications of the first type to create a first sum of tokens, removing tokens from the first sum of tokens as time passes, and monitoring the sum of tokens with respect to a first threshold;
a second token handling entity capable of adding tokens in respect of the classifications of the second type to create a second sum of tokens, removing tokens from the second sum of tokens as time passes, and monitoring the sum of tokens with respect to a second threshold;
wherein the classification block is capable of determining a state of the neighbor relation according to the relative levels of the first and second sums of tokens and their respective thresholds.

According to a seventh aspect of the invention there is provided a computer program product comprising software code that when executed on a computing system performs a method of managing neighbor relations between cells comprising the steps of:
receiving requests for admission of a neighbor relation;
adding tokens in respect of each request;
removing tokens as time passes; and
admitting the neighbor relation if the number of tokens passes a threshold.

According to an eighth aspect of the invention there is provided a computer program product comprising software code that when executed on a computing system performs a method of managing neighbor relations between cells comprising the steps of:
classifying handovers associated with a neighbor relation between cells into classifications of a first type and classifications of a second type;
adding tokens in respect of the classifications of the first type to create a first sum of tokens, removing tokens from the first sum of tokens as time passes, and monitoring the sum of tokens with respect to a first threshold;
adding tokens in respect of the classifications of the second type to create a second sum of tokens, removing tokens from the second sum of tokens as time passes, and monitoring the sum of tokens with respect to a second threshold; and
determining a state of the neighbor relation according to the relative levels of the first and second sums of tokens and their respective thresholds.

Preferably, the computer program product has executable code portions which are capable of carrying out the steps of the method.

Preferably, the computer program product is stored on a computer-readable medium.

According to a ninth aspect of the invention there is provided a method of managing neighbor relations between cells comprising the steps of:
classifying handovers associated with a neighbor relation between cells into classifications of a first type and classifications of a second type;
determining a state of the neighbor relation according to the relative level of tokens reflecting the classifications of the first and second types and at least one threshold.

In the context of the invention, managing neighbor relations may include at least one of establishment, maintenance, and removal.

Figure 2:
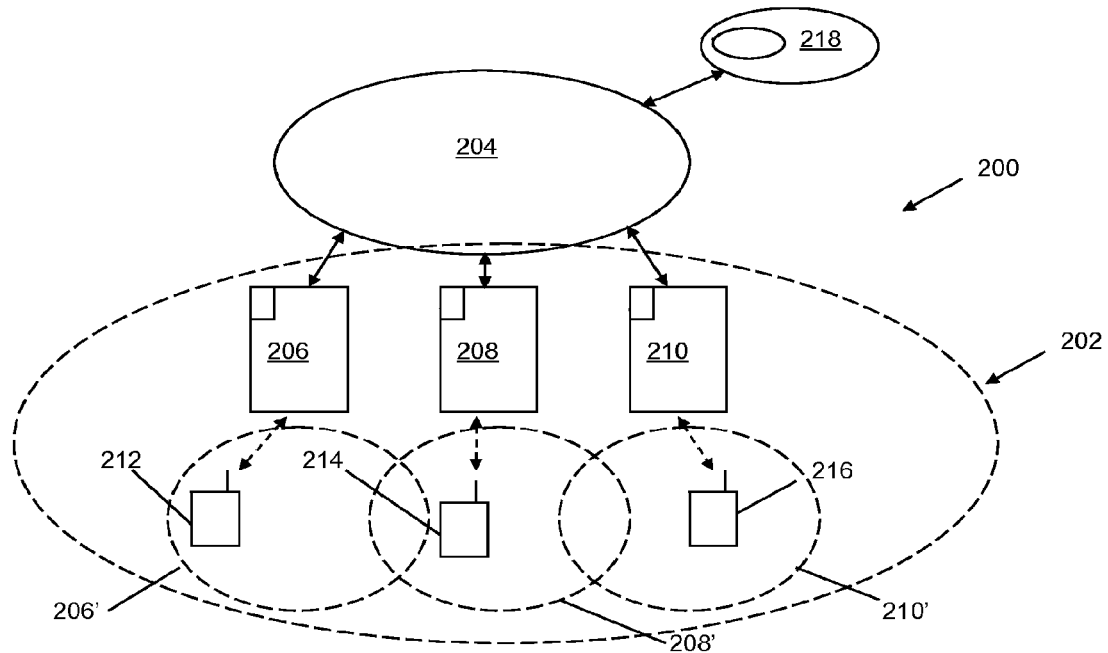
Figure 3:
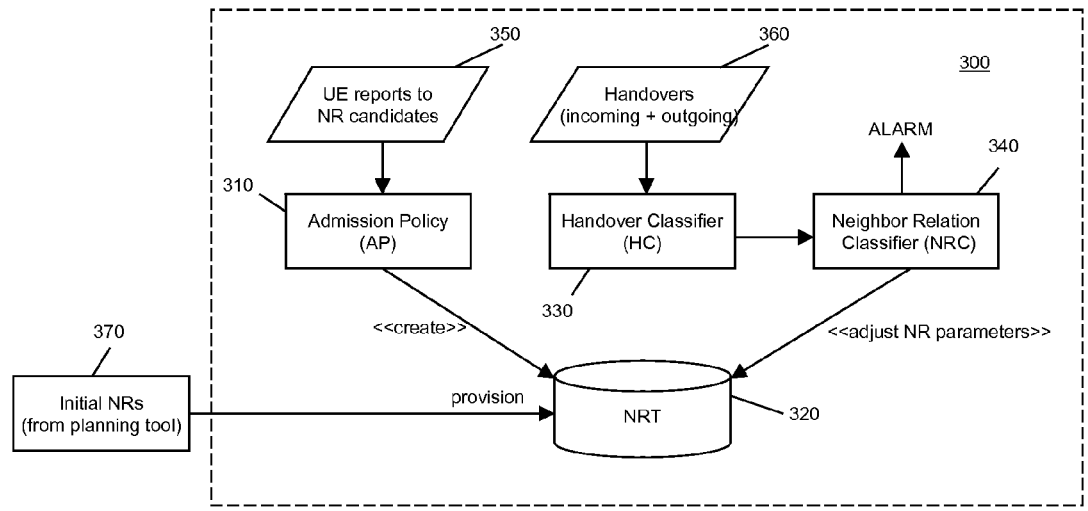
Figure 4:
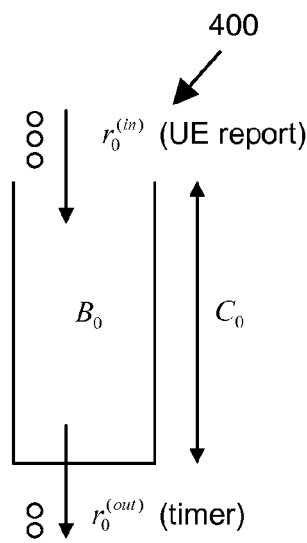
Figure 7:
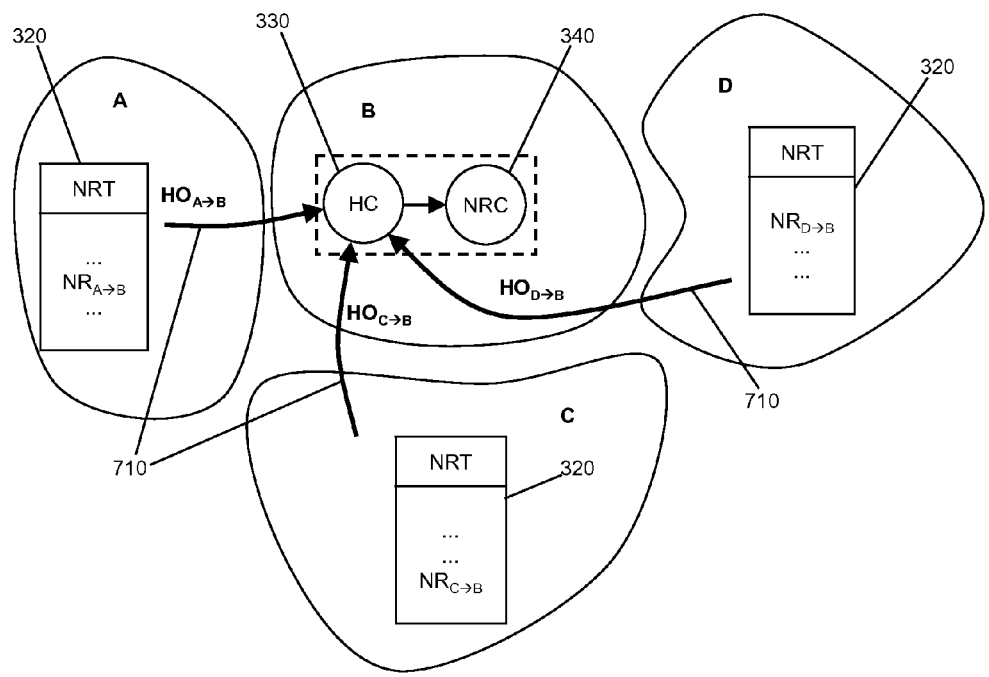
Figures 8A, 8B:
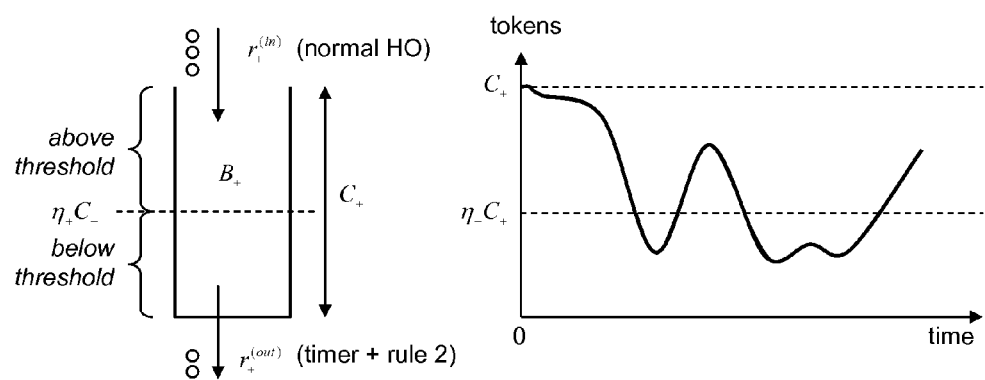
Figures 9A, 9B:
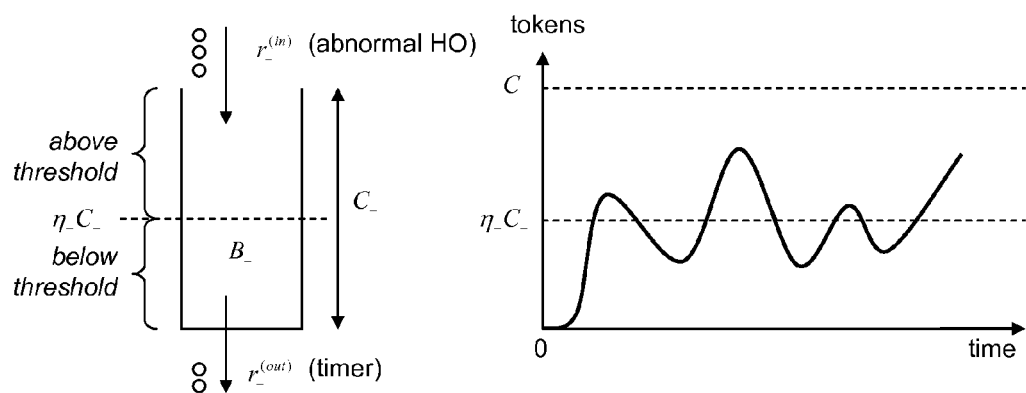
Figure 10:
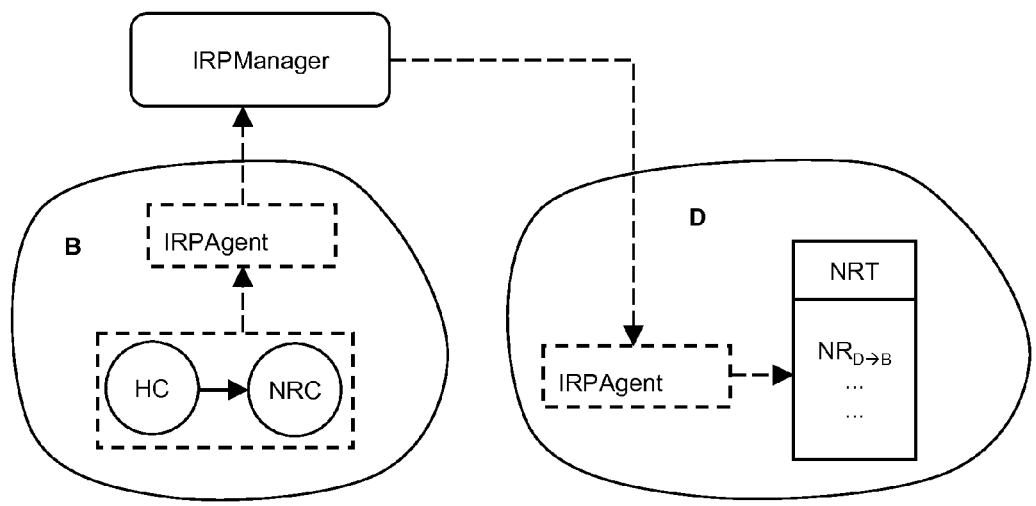
Figure 11:
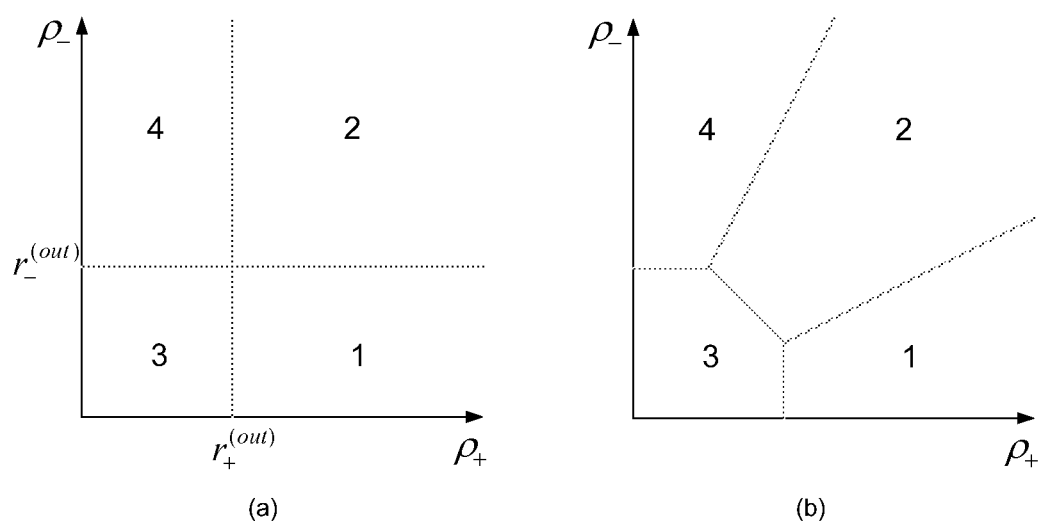

An embodiment of the invention will now be described, by way of example only, with reference to the accompanying drawings in which:
FIG. 1 shows a cell having an overhearing spot;
FIG. 2 shows an LTE mobile communications network;
FIG. 3 shows functional blocks present in an eNB;
FIG. 4 shows a policy block represented by a leaky bucket;
FIG. 5(a) shows a handover classification criterion;
FIG. 5(b) shows a handover classification criterion;
FIG. 6 shows operation of a handover classifier block;
FIG. 7 shows mapping of incoming handovers to NRs;
FIG. 8(a) shows a first leaky bucket used to classify NRs;
FIG. 8(b) shows an example variation of bucket occupancy with respect to time;
FIG. 9(a) shows a second leaky bucket used to classify NRs;
FIG. 9(b) shows an example variation of bucket occupancy with respect to time;
FIG. 10 shows a mechanism used to propagate NR attribute change; and
FIG. 11 shows different phases provided by respective implementations of classifying neighbor relations.

FIG. 1 has been described in the foregoing.

FIG. 2 shows an LTE mobile communications network 200 comprising a RAN 202 and a core network 204. The RAN has a number of eNBs 206, 208, and 210 which provide radio access to mobile terminals 212, 214, and 216 present in cells 206', 208', and 210', and the core network 204 has functionality to provide for call switching/routing and call control, service provision, authentication and charging, and interconnection enabling access to other networks.

When a new eNB is deployed, it is configured with initial NRs which have usually come from a planning tool. Initial NRs are based on cell coverage assessment and define the neighbor relations and adjacencies that are expected to exist for the new eNB. These are put in a Neighbor Relation Table (NRT) of the new eNB and are subsequently maintained there during the deployment of the new eNB.

In addition, an operations, administration, and maintenance (OAM) function 218 is linked to the core network 204 and is capable of configuring and provisioning network nodes of the RAN 202 and the core network 204. It also carries out various related tasks such as collecting network statistics, alarm monitoring, and logging of events. The resulting statistics, alarms and logs are used by a network operator to monitor the health and performance of the network 200. Both the core network 204 and the OAM function 218 are present within the domain of the network operator and both are under its control.

Expressed in terms of the Telecommunications Management Network (TMN) model, the eNBs and the core network 204 are present in a network element (NE) layer, and functionalities of the OAM function 218 are present in element manager (EM), domain manager (DM), and network management (NM) layers. The EM layer is a distributed functionality, while the NM layer can be considered as a centralised functionality.

The ANR function is closely related to self-configuration, which is used to provide newly deployed eNBs with their initial configuration (including radio and transport network parameters, and downloads of software). It is currently being standardised by the 3rd Generation Partnership Project (3GPP) using the well-known Integration Reference Point (IRP) concept, which splits the management and execution of the self-configuration process between IRPManagers (which, depending on the way in which the IRPManager is operating, may be located in the OAM function 218) and IRPAgents (which, depending on the function being carried out, may be present in the EM layer and, in particular, may reside in NEs, for example eNBs). It should be noted that the OAM function 218 may be present in the EM layer as IRPAgent and/or may be present in the NM layer as IRP-Manager. The IRP defines high-level requirements and means to monitor, interrupt, and continue the self-configuration process from the IRPManager, providing a framework for operators to supervise an automated configuration.

The management of the ANR function is provided by using IRPManagers and IRPAgents. In the context of ANR, the IRPManager is responsible for tracking NRs from the OAM side, and the IRPAgent comprises the ANR functionality itself in the eNB that manages NRs based on UE measurement reports. The IRPAgent notifies the IRPManager about changes it makes in the NRs in order to maintain synchronisation between the IRPAgent and the IRPManager.

This also provides a standardised way to supervise the NRs from the OAM side (IRPManager). If the IRPManager finds out that an unsuitable NR has been added by the ANR function, it may "blacklist" the NR, which means that further triggers by the ANR function will not add this particular NR even if there has been a UE measurement report to a relevant cell.

The invention will firstly be described in terms of general principles and secondly in terms of specific implementations. Referring now to FIG. 3, this shows the functional blocks present in an eNB 300 in order to provide the functionalities of the invention. In addition to the conventional functional blocks of an eNB relating to establishing and maintaining connections across an air interface and communication with other network elements, the eNB 300 comprises an Admission Policy (AP) block 310, an NRT 320, a Handover Classifier (HC) block 330, and a Neighbor Relation Classifier (NRC) block 340. The ANR function of the eNB 300 can be considered to comprise all of the elements shown in FIG. 3 except for a planning tool 370 used in provisioning (referred to in the following) and the NRT 320 (which is a database which is modified by the ANR function).

In the operational state of the eNB, as a serving eNB it receives UE (mobile terminal) measurement reports containing, for example, signal strength and/or signal quality parameters relating to cells in the vicinity of the mobile terminal. The measurement reports contain identifications of specifics cells (cell IDs). The identity of a base station serving a cell can be derived from the cell ID. The measurement reports may list cells about which the eNB is already aware as well as unknown cells for which a NR might be added. These reports, which include both cells already known to the serving eNB and hitherto unknown cells, are provided 350 to a Radio Resource Control (RRC) entity of the eNB and thence as input to the AP block 310. Accordingly, on receiving the UE measurement reports, or relevant information abstracted from such reports, the AP block 310 may discriminate between NR candidates (that is the identification of neighboring cells with which there is no established NR and for which a new NR may be established) and cells for which an NR has already been established. The UE measurement reports can be considered as requests or demands for adding a new NR. In contrast to the prior art in which an NR is added to an NRT immediately after a report identifies the cell to the eNB for the first time, according to the invention, the AP block 310 applies an admission policy that permits the addition of the NR in the event that the eNB can make sure there is a reasonable demand for the NR. Therefore, it can be seen that the Admission Policy block 310 decides on admission (that is whether to create the new NR), and in the event that admission is allowed, instructs the NRT 320 to create the NR.

The HC block 330 and the NRC block 340 together form a monitoring/adjustment function for monitoring, evaluating, and possibly modifying, existing NRs. Whenever a handover is handled by the eNB 300, whether it is an incoming or an outgoing handover to or from a cell, information about the handover is provided 360 by a handover management entity (not shown), that receives measurement reports as input and outputs handover decisions, to the HC block 330 which decides for each individual handover at a cell whether the handover in question is desirable from the overall LTE system's point of view. The HC block 330 provides the classification for each incoming handover, that is whether it was normal or abnormal, to the NRC 340. The NRC block 340 uses the output of the HC block 330 in order to map an identified handover to a corresponding NR in order to make decisions about it. The NRC block 340 updates its internal knowledge about whether the NR should be kept or removed. The NRC block 340 may send an alarm and/or change the NRT 320 if the NR is to be removed. This does not necessarily happen each time the HC block 330 sends a handover classification, so an input to the NRC block 340 does not necessarily trigger an output by this block.

FIG. 3 also shows provisioning of the eNB 300 with initial NRs from the planning tool 370.

The Admission Policy block 310, the HC block 330, and the NRC block 340 will now be discussed in greater detail.

Admission Policy Block 310

The AP block 310 comprises a leaky bucket 400, shown in FIG. 4 and denoted by $B_0$, maintained separately for each NR candidate. The $B_0$ bucket has a capacity of $C_0$ tokens and a constant leak rate at which tokens are removed of $r_0^{(out)}$. The bucket 400 is created for an NR candidate the first time a UE measurement report arrives reporting an unknown cell. Initially, the bucket is empty, that is, it contains no tokens. The parameters of the bucket are summarized in Table 1.

TABLE 1

Parameters of the $B_0$ leaky bucket used by the Admission Policy block 310

| bucket | capacity | initial tokens | input | input rate | leak rate | trigger for action |
|---|---|---|---|---|---|---|
| $B_0$ | $C_0$ | 0 | UE reports (A3 trigger) | $r_0^{(in)}$ | $r_o^{(out)}$ | overflow |

In this document, the term "leaky bucket" is intended to refer to a counter functionality to which both incrementing and decrementing operations may be applied such that over a period of time there is both a rate of addition and a rate of subtraction with respect to a total amount represented by the counter. The total amount may be variable with respect to time because the rates of addition and subtraction do not have to be the same. Depending on the implementation, these rates are not necessarily fixed.

Proper calibration of the bucket parameters is a straightforward task if the input rate of the UE measurement reports is known (for example, by taking measurements in a live network to find out the actual measured reporting rate for each NR candidate). Compared to the measured reporting rate, a slightly lower leak rate can be set as $r_0^{(out)}$ in order to ensure that the usual rate will make the number of tokens increase and thus the bucket will eventually overflow, resulting in a new NR. The capacity of the bucket can be adjusted to tune the desired time until overflow.

The AP block 310 operates as follows. As each UE measurement report is received by the AP block 310, predefined numbers of tokens are put in the leaky buckets 400 corresponding to the NR candidates referred to in the report. The number of tokens added in respect of each report may reflect the weight of the UE measurement report. In one implementation, the weight of the report is an integer between, for example, 1 and 5, and therefore, a suitable number of tokens within this range may be added to the leaky buckets 400. Since the addition of tokens is event-driven and not timer-driven, the $r_0^{(in)}$ rate at which tokens are generated is not constant. The AP block 310 creates the NR corresponding to the bucket if the bucket overflows. In this way, it will be seen that the capacity of the bucket is, in effect, a threshold.

The choice of leaky buckets for this implementation means that the AP block 310 is able to simultaneously capture the incoming rate of the demands (that is, UE measurement reports) and the burstiness of the demands. It can be assumed that the first report for an NR candidate arrives at $t_0$. The leaky bucket will overflow and thus the NR will be created by the AP block 310 at $t_0+\tau$ when:

$$\int_{t_0}^{t_0+\tau} (r_0^{(in)}(t) - H_0(t) \cdot r_0^{(out)}) dt > C_0 \quad (1)$$

The function $r_0^{(in)}(t)$ denotes the current rate of token generation at time t and denotes a sum of Dirac impulses with suitable weights. $H_0(t)$ indicates if the bucket is empty at a given time t:

$$H_0(t) = \begin{cases} 0 \text{ if } B_0 \text{ is empty} \\ 1 \text{ otherwise} \end{cases}$$

In other words, an NR is created if there is a sufficiently long interval $[t_0, t_0+\tau]$, where the average rate of token generation is above $r_0^{(out)}+C_0/\tau$.

From equation (1), it can be seen that the time $\tau$ needed for a bucket to overflow depends on the intensity of the token generation and thus that of the incoming requests. Therefore, an Admission Policy can be applied. On the one hand, if the demand is only slightly over the leak rate, it has to be sustained over a longer period of time, thus the inflow of UE measurement reports has to justify that the demand is sufficiently stable and, presumably, will not fall away after the NR has been added. On the other hand, if there is a sudden increase of demands (for example, due to a change in radio propagation conditions which may be the result of a neighbor cell outage), then the AP block 310 can accept a new NR sooner, in other words be more responsive. By carefully choosing the capacity and the leak rate, one can tune the time needed for the bucket to overflow (that is for an NR to be accepted) and also the minimum demand (incoming rate) that is required even to add the NR. The operation of the AP block 310 is summarized in Table 2.

TABLE 2

Actions taken by the AP block 310 depending on the state of the bucket $B_0$.

| $B_0$ bucket state | action |
| --- | --- |
| reached $C_0$ (overflow) | add NR candidate to NRT |
| below $C_0$ capacity | nothing (do not add NR) |

In one embodiment of the invention, the leak rate of leaky buckets may be set based on the measured reporting rate. In another embodiment, it may be based on a "distance" measure in the transport network. This can be expressed in any suitable way such as round-trip time, virtual local area network (VLAN) configuration, or network load over a traffic link (with a higher load possibly slowing down traffic transmission) In this case, it then is possible that a new NR may be established in cases where the transport network cost of the corresponding X2 interface is high, provided that there is enough demand for that handover. In yet another embodiment, the leak rate of leaky buckets may be based on both the measured reporting rate and the distance.

The foregoing indicates that an NR may be admitted if the bucket $B_0$ overflows, meaning that according to this part of an admission assessment, the case for adding a new NR is met if there is sufficient demand. However, in addition to checking for overflow, a sanity check may also be run to evaluate the new NR in order to determine whether it will, actually, be created. The criteria for evaluation may include the following:

(i) NR between a macro and a micro/pico cell: If the NR candidate is between an outdoor macro cell and a pico cell inside a building, that is above a ground floor level where people cannot enter and leave the building, it might be preferred not to add such an NR even if from a radio propagation perspective the cells appear to be adjacent and there is seemingly enough demand for handovers between them.

The reason for not preferring such handovers is that the operator usually deploys pico cells in order to provide good indoor coverage for subscribers. If handover to an outside macro cell is permitted, this may indicate either bad planning (insufficient access points, undesirable placement or direction) or outage of the indoor infrastructure, for example a pico cell. In either case, the network operator should be notified about the issue. In the case of outage, handover to the outdoor macro cells may be allowed to provide service until the problem is resolved. Similar considerations may apply in other situations. For example, if the NR candidate is between a cell serving an underground area such as a subway and a macro cell above ground, this may require resolution. However, an NR to enable handover at the entry/exit points of a subway tunnel (where users go down and up) between the subway cell and the outside macro cell should be enabled to make seamless calls possible during travelling.

(ii) Transport network considerations. If the NR candidate is between cells that have a transport network cost between them that is too high, the AP block 310 may be configured to deny adding an NR candidate. This may be caused by the "distance" between the cells being too large. However, the NR may be added if it is possible for the AP block 310 to trigger a transport network optimisation or reconfiguration to bring the two eNBs closer to each other in terms of transport network cost.

Instead of, or in addition to, the transport network "distance", other parameters may be taken into account when the transport network impact is evaluated, such as the measured average end-to-end delay, number of hops, load/utilisation of the links, or a cumulative cost calculated by summing up weights of intermediate links where weight is either a static parameter associated with each link or is a calculated parameter based on the average load measured on each link and the VLAN tags (that is identities) of the source and target eNBs. For example if the identities of VLANs are different, then the eNBs are in different VLANs, which usually means a higher transport network cost for an X2 connection between them compared to two eNBs from the same VLAN. Creating an X2 interface between two eNBs mapped to different VLANs might not be feasible due to the transport implications). If the cost of an X2 connection is considered too high but the NR is otherwise needed, the NR may be configured to provide S1 handovers instead of X2 handovers.

Generally, in case the sanity checks find that the NR candidate would not be desirable, its addition should be forbidden (for example by the IRPManager). In addition, the network operator may be notified about the issue by the AP block 310 sending an ALARM notification to the OAM function 218.

In a refinement of the invention, mobile terminal measurement reports are differentiated by the grade of an associated subscription (premium, gold, etc.) and weighted accordingly. Demand from "higher-grade" subscriptions, which can include those generating high revenue, can thus be given more weight than reports from "lower-grade" subscriptions. Therefore, mobile terminal reports may be weighted differently so that the demand represented by an incoming measurement report may be variable. In a specific embodiment of the invention, a measurement report is given more weight more if:

(i) the grade of subscription (premium, gold, silver, etc.) is higher;
(ii) the user is generating high revenue anyway (even with low subscription rate); and/or
(iii) there is a risk of high churn rate, and maintaining or increasing the quality of service (QoS) experienced by the end users by adding the new NR is desirable for the operator in order to keep the customers.

This may be achieved by assessing the measurement report to determine the grade of subscription of a related subscriber. In respect of cells identified in that report, and thus corresponding NRs, for which one or more tokens is to be added to a corresponding bucket, the number of tokens to be added reflects the weight of the measurement report. The preceding implementation may be followed and the weight of the measurement report may be an integer between, for example, 1 and 5, and therefore, a suitable number of tokens within this range may be added to the leaky buckets 400.

Based on the foregoing, it can be seen that the requirements for the AP block 310 can be summarised as follows:
1. Generally, a single report, or even just a few measurement reports, should not trigger the addition of an NR. If there is low demand for the NR (that is, only a few mobile terminals would use it, or it has been requested as the result of a rogue report), it is not worth creating an NR and carrying out a complete X2 set-up. Demand estimation may be combined with a method for weighting mobile terminals as discussed in the foregoing.
2. If a reasonably high demand appears suddenly, there should not be an over-long delay between the appearance of the demand and the addition of a corresponding NR. This can be convenient in the case of new reports appearing as a result of a cell outage. Also, enabling the new NR candidates would help maintain the required QoS in the locality of the failure until a network operator is able to repair the faulty cell and provide a long-term solution.

Handover Classification Block 330

Once an NR has been accepted for addition and created by the AP block 310, it is subject to continuous monitoring and evaluation by the NRC block 340. Since the operation of this block is based on the output of the HC block 330, operation of the HC block 330 is discussed before that of the NRC block 340.

The HC block 330 monitors each incoming and outgoing handover at a given cell but only determines whether incoming handovers are normal or abnormal. The reason for only classifying incoming handovers is explained in the following in relation to specific examples. The classification of a handover is made according to a rule based on a minimum occupancy time $T_{min}$.

Let $T_{min}$ denote a time interval that, at least, should be spent by a mobile terminal in a cell before there is handover of that mobile terminal to another cell. If the mobile terminal leaves the cell before the period $T_{min}$ has passed, the incoming handover via which the mobile terminal entered the cell is considered abnormal. Otherwise, the incoming handover is considered to be normal. The motivation behind this rule is to consider those handovers abnormal where the mobile terminals spend only a short time in the target cell. The choice of the value for $T_{min}$ is specific to the distribution of handovers that may be experienced by a cell. Therefore, in one implementation, cell-specific values of $T_{min}$ are assigned to different cells. The calibration of this and other parameters is described in the following.

It should be noted that the HC block 330 does not classify NRs, but rather classifies individual handovers. The decision about NRs is in the hands of the NRC block 340, based on the classification by the HC block 330 of individual handovers.

FIGS. 5(a) and 5(b) show handover classification criteria and, in particular, time spent by a mobile terminal in a cell compared to $T_{min}$.

Two typical scenarios for abnormal handovers between a cell A and a cell B are shown. In the first case, FIG. 5(a), after a $HO_{A \rightarrow B}$ handover, a mobile terminal quickly returns to the cell A. The time spent in the cell B can be determined in both the base station of the cell A and that of the cell B. However, in the second case, FIG. 5(b), the mobile terminal which quickly leaves the cell B does not return to the cell A, and therefore the time spent in the cell B can be measured only by the base station of the cell B. This is the reason why the $HO_{A \rightarrow B}$ handover is classified in the cell B, and, generally, only incoming handovers are classified in each cell.

The operation of the HC block 330 is described in FIG. 6. This shows the handling of incoming handovers and outgoing handovers, with respect to an eNB, represented by two flowcharts, 610 and 620, respectively.

Referring to the flowchart 610 representing incoming handovers, for each incoming handover 612, a count-down timer is set up for the corresponding mobile terminal and at the same time the source cell of this UE is set to the source cell of the handover 614. If a timer in respect of the mobile terminal expires without a further handover for that mobile terminal taking place 616, then the preceding incoming handover is classified as normal 618.

Referring to the flowchart 620 representing outgoing handovers, for each outgoing handover 622, it is checked whether a timer for the corresponding mobile terminal is running 624, that is it has not yet expired. If it is, then the preceding incoming handover is classified as abnormal 626.

If it is not, then either the timer has already expired (in which case the incoming handover has already been classified as normal and no "classification on outgoing handover" needs to be made) or the mobile terminal has changed from an idle mode to an RRC-connected mode, for example to make a call, and so there has not been an incoming handover for this mobile terminal which is useable to make a proper determination of "normality". If the timer for the mobile terminal is not running and there has not been a classification, there is no classification at all 627.

Finally, if a mobile terminal goes idle before its timer expires 628, its timer is cancelled 629 and its incoming handover is not classified. This is because, in respect of an idle mobile terminal, it is not possible to determine a time at which it leaves the cell due to the lack of an outgoing handover.

As can be seen from the foregoing, handover classification works by tracking the progress of a mobile terminal entering and leaving a cell. Accordingly it requires, at least, for the mobile terminal to have had an active connection with the serving eNB which is subject to incoming and outgoing handover. In one embodiment of the invention, the active connection is an RRC-connection. In the embodiment described with respect to FIG. 6, if a mobile terminal goes idle before its timer expires, its timer is cancelled and the corresponding incoming handover is not classified. Therefore, it will be seen that in this embodiment, a continuous active connection during the points of incoming and outgoing handovers is required, although it should be recognised that this is not necessarily the case in other embodiments.

NRC Block 340

The task of the NRC block 340 is to decide if an existing NR is desirable or not. The NR classification is based on the output of the HC block 330. Therefore, the NRs that can be classified at a cell are those that enable incoming handovers to the cell, since only the incoming handovers are classified by the HC block 330. FIG. 7 shows handovers occurring between cells A, B, C, and D. Incoming handovers 710 are made into a target cell (the cell B), which causes the HC 330 to provide HO classification information, in respect of NRs, to the NRC 340. The NRs corresponding to the incoming handovers are registered in the NRT 320 of a source cell (cells A, C, and D) of the NR and not in the NRT 320 of the target cell, the cell B. The NRC block 340 in each cell classifies the NRs that point from a neighboring cell to itself, as can be seen in FIG. 7. Here, it can be seen that the NRC block 340 in the cell B classifies the NRs that originate from the neighboring cells A, C, D and point to the cell B. If an NR is classified in the NRC block 340 of the cell B and an attribute of this NR is to be modified, then this has to be communicated to the cell managing the corresponding NR in its NRT, that is, to the cell A, C, or D. This is discussed further in the following.

After a particular incoming handover is classified as normal or abnormal by the HC block 330 of the eNB 300, the information is passed to the NRC block 340, which then operates to incentivise or penalise the corresponding NR that made that particular handover possible. The method used by the NRC block 340 for incentivising or penalising a NR is also based on leaky buckets, applying a similar principle to that applied to the leaky bucket used by the AP block 310. In one embodiment of the invention, the NRC block 340 manages two leaky buckets, $B_+$ and $B_-$, for each NR that points to the cell in which the NRC block 340 is running. The leaky buckets are shown in FIG. 8(*a*) representing the leaky bucket ($B_+$) used by the NRC block 340 for each NR to incentivise normal handovers, and in FIG. 9(*a*) representing the leaky bucket ($B_-$) used by the NRC block 340 for each NR to penalise abnormal handovers. The leaky buckets may be implemented by incrementing or decrementing a counter in a memory.

The NRC block 340 cooperates with the HC block 330 in such a way that if the HC block 330 classifies an incoming handover as normal, tokens are added by the NRC block 340 to the $B_+$ bucket of FIG. 8(*a*). Otherwise, tokens are added by the NRC block 340 to the $B_-$ bucket of FIG. 9(*a*). The number of tokens may also reflect the weight of the mobile terminal that was subject to the handover, in a way which is similar to the method used by the AP block 310. Tokens leak from the leaky buckets at rates of $r_+^{(out)}$ and $r_-^{(out)}$.

The $B_+$ bucket of FIG. 8(*a*) starts with a full state, that is, the initial number of tokens equals its capacity, $C_+$. This is shown in the accompanying FIG. 8(*b*) which shows an example variation of bucket $B_+$ occupancy, in terms of tokens, with respect to time. The $B_-$ bucket of FIG. 9(*a*) is initially empty. This is shown in the accompanying FIG. 9(*b*) which shows an example variation of bucket $B_-$ occupancy, in terms of tokens, with respect to time. The reason for these initial values is that a newly added NR is added without there being any handover statistics, but since it has been added, it is assumed that there is a reasonable demand for this NR.

It should be noted that classifying handovers by the HC block 330 and then generating tokens by the NRC block 340 based on the judgment of the HC block 330 does not involve any inter-cell communication, it only involves administering tokens locally by the NRC block 340. Therefore, it does not introduce any bottleneck to the handover procedure, which should be conducted as quickly as possible.

The parameters of the leaky buckets used by the NRC block 340 are summarised in Table 3. Unlike the $B_0$ leaky bucket that triggered the creation of a NR in the AP block 310 on overflow, the NRC block 340 maintains thresholds associated with its leaky buckets to discriminate the state of the leaky buckets into below- or above-threshold states. The thresholds can be expressed by two threshold ratios called $\eta_+$ for $B_+$ and $\eta_-$ for $B_-$ (where $0<\eta_+,\eta_-<1$), with the threshold values (or simply thresholds) being given by the product of a threshold ratio and the capacity of the corresponding bucket so that it can be seen that the thresholds in this case are $\eta_+ C_+$ and $\eta_- C_-$. These thresholds are shown in FIGS. 8(*b*) and 9(*b*) in which it can be seen that bucket occupancy may fall below or rise above its respective threshold as time passes. The value of the threshold ratios is implementation dependent. A reasonable default value is 0.5 for each leaky bucket. It is permitted for $\eta_+ \neq \eta_-$. The state of a leaky bucket is considered "above threshold" if the number of tokens in the bucket is higher than the threshold value and "below threshold" otherwise.

TABLE 3

Parameters of the $B_+$ and $B_-$ leaky buckets used by the NRC block 340

| bucket | capacity | initial tokens | input | input rate | leak rate | trigger for action |
|---|---|---|---|---|---|---|
| $B_+$ | $C_+$ | $C_+$ | normal HO | $r_+^{(in)}$ | $r_+^{(out)}$ | above/below threshold |
| $B_-$ | $C_-$ | 0 | abnormal HO | $r_-^{(in)}$ | $r_-^{(out)}$ | above/below threshold |

If the $B_+$ bucket is above threshold, it means that the number of normal handovers is sufficiently high to justify the existence of the NR. If the $B_+$ bucket is below threshold, it means that the number of normal handovers is not high enough and the advantage provided by allowing those handovers is too low. The capacity and the threshold ratio of the bucket can be tuned to control how quickly the leaky bucket empties if the flux of normal handovers falls below the threshold. Considering a full leaky bucket, the time $\tau$ required for the contents of the leaky bucket to be below the threshold can be expressed as:

$$C_+ - \tau \cdot r_+^{(out)} = \eta_+ C_+$$

from which it follows that:

$$\tau = (1 - \eta_+) \cdot \frac{C_+}{r_+^{(out)}}$$

A similar evaluation of the leaky bucket $B_-$ can be carried out. However, in the case of the leaky bucket $B_+$, the desired state is for the contents of the leaky bucket to be below the threshold rather than above it. If the leaky bucket $B_-$ is above the threshold, it means that there is a considerable amount of abnormal HO traffic. On the contrary, if it is below threshold, it means that any abnormal HO flux is tolerable. The capacity and the threshold ratio of the leaky bucket $B_-$ can be adjusted to reflect desired behaviour.

TABLE 4

Actions taken by the NRC block 340 based on the state of the $B_+$ and $B_-$ leaky buckets

| state no. | $B_+$ bucket state | $B_-$ bucket state | action |
| --- | --- | --- | --- |
| 1 | above threshold | below threshold | enable HO (set noHO = false, noX2 = false) |
| 2 | above threshold | above threshold | ALARM (both normal and abnormal HOs) |
| 3 | below threshold | below threshold | ALARM (unneeded NR); may also disable X2 (set noX2 = true) |
| 4 | below threshold | above threshold | ALARM (abnormal HOs only); may also disable HO (set noHO = true) may also disable X2 (set noX2 = true) |

It will be understood that state 1 is a desirable state, states 2 and 3 are neutral states meaning that although there are advantages and disadvantages for keeping the NR, but it is not a desirable state and should be resolved requiring an ALARM to be raised, and state 4 is an undesirable state requiring resolution.

The actions taken by the NRC block 340 based on the state of the leaky buckets are shown in Table 4. There are four different combinations of leaky bucket states, each of them resulting in different actions, which are performed when a state change is realised (when the corresponding combination of bucket state has been realised). That is, if a state changes from state A to state B, the actions associated with state B are performed (for any A≠B) once. It should be noted that the "actions" are applied to the attributes of an NR in the NRT 320. The actions for each state are detailed and explained below:

1. There is sufficient flux of normal HOs to justify the existence of the NR and the number of abnormal HOs is also acceptable (below threshold). This is the desired state for all NRs. Also, after the AP block 310 creates a new NR, it starts from this state (this is the reason for choosing the initial number of tokens for $B_+$ and $B_-$ as $C_+$ and 0, respectively; see Table 3). If an NR enters this state later (after being in one of states 2 to 4), the corresponding handover should be enabled automatically along with the corresponding X2 connection.

2. Both normal and abnormal HOs are above threshold. In that case, the corresponding NR should not be disabled automatically, since it would disable normal handovers as well as abnormal ones. Instead, the network operator may be notified of the problem via an ALARM notification sent by the NRC 340 to the OAM function 218. The problem may require radio planning in order to be resolved if it is a result of unusual radio propagation and not a sudden cell outage in the area. The network operator may also decide to disable the NR if the adverse consequences of preventing normal handovers are considered to be, on balance, preferable to the adverse consequences of allowing abnormal handovers.

3. Neither normal nor abnormal handovers are above threshold, which means there are no, or only a few, handovers. This state indicates an under-used NR. Since it does not generate much, if any, traffic, the existence of such an NR is not a real problem. However, since the number of X2 connections that an eNB can maintain simultaneously may be limited, it may worth considering to set noX2=true for the NR in the source eNB in order to save resources. This can either be done automatically or, if the operator prefers, an ALARM notification can be sent to the OAM function. The limited number of handovers that may still be needed can be carried out via the S1 handover mechanism instead.

4. The number of normal handovers is low and there are also lots of abnormal handovers at the same time. This is the worst combination, and it would appear that the NR causes more harm than does good. In that case, an ALARM notification should be sent and, depending on the level of automation the operator prefers, the ANR may also disable handovers and/or the X2 connection automatically by setting noHO=true and/or noX2=true for the NR. Setting the attributes this way means that handovers are completely disabled between the cells to which the NR refers, and the X2 connection is torn down between the eNBs hosting the cells unless there are other NRs between cells of the same eNBs that require the X2 connection, in which case the X2 is not torn down. It should be noted that an X2 connection is an eNB-eNB connection and an NR is a cell-cell connection. Therefore, while a particular NR might no longer have need of an X2 connection, it might be required for other NRs between cells of X2 connected eNBs and so it can be desirable to keep the connection.

Therefore, it will be seen that handover classifications are used to assess NRs. If an NR is in state 2, 3 (not fully justified) or state 4 (not justified at all) and it changes to state 1 (fully justified), the NR attributes are modified so that handover is allowed (noHO=false) and an X2 connection is allowed (noX2=false). Since the NRC 340 operates on existing NRs, it does create a new NR, it only modifies the attributes of an NR as shown in FIG. 3 ("adjust NR parameters" between the NRC block 340 and the NRT 320).

The network operator may choose an appropriate level of automation at which the actions corresponding to the state changes occur in the NRC 340. If automatic NR attribute modification is preferred, the propagation of NR attribute modification requires suitable communication conducted through the standardised IRPAgent/IRPManager relationship. If the NRC block 340 in a cell determines that there has been a change in the state of an NR that it monitors, the NRC block 340 contacts the IRPAgent of its own cell, which in turn contacts a corresponding IRPManager and tells it how the attributes of the NR should be changed or whether it should be blacklisted. When an NR has been blacklisted, no automatic functionality (such as the ANR or the NRC 340) may alter it, for example remove the NR, re-establish it, or change its attributes. The IRPManager contacts the IRPAgent of the cell whose NRT contains the affected NR and instructs it to execute the appropriate commands. FIG. 10 shows a mechanism used to propagate NR attribute change from the NRC block 340 of a cell B to the NRT of a cell D. Dashed arrows indicate the direction of communication. It should be noted that communication through the IRPManager is done only when the state of a NR is changed, and not after each handover or token generation.

If the network operator prefers a lower level of automation, then it may only receive notifications and then decide to act accordingly, for example by manually blacklisting an NR. This may involve the intervention of an employee upon the network operator receiving an ALARM notification. This can be considered to be semi-automatic operation. It may be that the network operator is able to determine from some another source of information the cause of the anomaly (for example, a building being under construction that alters the radio propagation environment) and wants to reconfigure certain cell parameters before putting the NR back into the automatic evaluation cycle.

The reasoning behind the use of blacklisting is as follows. The NRC block 340 changes the state of an NR from state 1 to state 2, 3, or 4, indicating that there may be a problem associated with that NR. In this case, the network operator has decided that the NRC block 340 should not carry out any modifications on its own, and should instead send an ALARM. This could be, for example, that the NRC is present within a new implementation of one or more eNBs in the network, and the network operator wants get more accustomed to its operation until it is given more autonomy.

Therefore, the network operator receives an ALARM from the NRC block 340 which indicates that there is something wrong with the NR (for example, it entered state 2 of Table 4). The network operator finds out that the root cause of the NR going into state 2 is related to another part of the mobile network or its environment (buildings, etc.). To solve the root cause would take longer than merely selecting a change or manually changing parameters. Therefore, the network operator blacklists the NR and carries out the necessary optimisation or modification in the other part of the network (for example, re-planning the coverage of the cells). Meanwhile, the NR is blacklisted because the network operator considers that it should not be used until the necessary optimisation or modifications, which might be carried out manually, are completed.

Blacklisting an NR may be preferred to removing it completely because it means that the NR remains established and any subsequent reference in a measurement report to the source cell of the NR will not taken to be an identification of a new NR candidate. Complete removal of an NR may be carried out by the network operator in case it is known that the adjacency of cells involved in the NR has ended (for example, due to a radical change in radio planning, cell reconfiguration or relocation) and it is not foreseen that it will exist again.

If the NR were to be completely removed instead of blacklisted, information about its previous undesirable condition would be lost, that is the AP/HC/NRC blocks would no longer know that adding the NR, as a result of it being identified in a measurement report, would be likely to put the $B_+$ and $B_-$ leaky buckets beyond their respective thresholds and result in an new NR which would soon be in an undesirable state. Therefore, blacklisting can avoid a cycle of the AP block 310 accepting the NR, the NRC block 340 classifying it as being in an undesirable state, the NR being removed, and so on until the root cause is fixed.

In the above implementation of the NRC block 340, the $B_+$ and $B_-$ buckets indicate that the rate of normal and abnormal handovers are above or below a predefined threshold resulting in the four distinct states of Table 4. The method proposed in the foregoing may be improved by setting the critical rate of abnormal handovers (that is, the $B_-$ threshold) to depend on the overall rate of handovers, so that, for example, a higher tolerated rate for abnormal handovers exists if the rate of normal handovers is very high. Therefore, an alternative implementation of the NRC block 340 is presented in the following where the rate of normal handovers and the rate of abnormal handovers are measured directly, which allows for more flexibility in the identification of the states presented in Table 4. Just like in the previous case, for each ordered pair of cells two buckets are maintained for the classification of handovers. After each normal or abnormal handover from a cell A to a cell B, the number of tokens is incremented in leaky bucket $B_+$ or $B_-$, respectively.

FIG. 11 shows different phases provided by the first (fixed thresholds) and alternative (variable thresholds) implementations of the NRC block 340. Referring to the first implementation (corresponding to Table 4), FIG. 11a shows that phase boundaries are horizontal and vertical lines in the ($\rho_+$; $\rho_-$) diagram. Referring to the alternative implementation, FIG. 11b shows that the tolerated rate of abnormal handovers increases with increasing overall rate of handovers. In other words, the configuration is more flexible.

The policies (parameters) controlling the selection of the NRs to be modified and/or disabled may be deployed in the IRPManager via an OAM interface. Accordingly, they should be documented so that the ANR functionality may be readily operated/adjusted by an external planning or OAM monitoring tool (which is the usual practice).

Having now described the functions of the relevant blocks, calibration of parameters used in the blocks will now be described. The implementations of the HC block 330 and the NRC block 340 described in the foregoing include a number of parameters. In each cell under consideration, calibration is done independently for each neighboring cell. During a calibration period (typically several days), the distribution of the time spent in the cell under consideration by mobile terminals is measured for those connections for which an incoming handover was carried out from a neighboring cell. The distribution is measured independently for each neighbor. That is, in this example, there are three distributions measured in cell A: a distribution of the time spent by users coming from the cell B, a distribution of time for users coming from the cell C, and a distribution of time for users coming from the cell D. $T_{min}$ is chosen as the $\xi$-quantile of the obtained empirical distribution, that is, the shortest $100 \cdot \xi$ percent of the measured duration times fall under $T_{min}$. A reasonable value for $\xi$ is 0.05. Those cases for which the duration time is under $T_{min}$ are considered to be abnormal. During the calibration period, the overall rate of incoming handovers $\bar{r}^{(in)}$ is also measured, from which the average rate of normal and abnormal incoming handovers ($\bar{r}_+^{(in)}$ and $\bar{r}_-^{(in)}$) can be obtained as:

$$\bar{r}_-^{(in)} = \xi \cdot \bar{r}^{(in)}, \text{ and } \bar{r}_+^{(in)} = (1-\xi) \cdot \bar{r}^{(in)}.$$

Assuming that the sample collected in the calibration period represents the normal (well-configured, healthy) operation, the leak rates ($r_+^{(out)}$ and $r_-^{(out)}$) of the two leaky buckets managed in the NRC block 340 can be chosen relative to $\bar{r}_+^{(in)}$ and $\bar{r}_-^{(in)}$:

$$r_+^{(out)} = \alpha_+ \cdot \bar{r}_+^{(in)}, \text{ and } r_-^{(out)} = \alpha_+ \cdot \bar{r}_-^{(in)}$$

with:

$0 < \alpha_+ < 1$, and $1 < \alpha_-$.

This implies that, referring to Table 4, a state transition from state 1 happens (and an ALARM is raised) if the average rate of abnormal handovers goes above $\alpha_- \cdot \bar{r}_-^{(in)}$ (state 2) or the rate of normal handovers goes below $\alpha_+ \cdot \bar{r}_\circ^{(in)}$ (state 3). Recommended values for $\alpha_+$ and $\alpha_-$ are:

$\alpha_+ = 0.5$ and $\alpha_- = 2$.

The capacity of the two leaky buckets can be chosen as:

$$C_\pm = T_c \cdot r_\pm^{(out)}$$

Here $T_c$ represents a characteristic time: if $r_\pm^{(in)}$ is significantly below/above $r_\pm^{(out)}$, then the time needed for leaky bucket $B_\pm$ (that is $B_+$ or $B_-$ as the context demands) to become empty/full is of the order of $T_c$. In order to cover a whole day, $T_c \approx 24$ hours is recommended.

In contrast to the foregoing in which there may be a leak rate may be based on the overall rate of incoming handovers, in another embodiment, in the case of there being no handovers, the contents of the leaky buckets may decrease exponentially in time, for example:

$$Q_\pm(t_0+t) = Q_\pm(t_0) e^{-t/t_c}$$

where the contents of each of the two leaky buckets is represented by $Q_\pm$ (that is $Q_+$ or $Q_-$ as the context demands) and $t_c$ is a characteristic time.

It can be proven that with such a rule, the expected value of $Q_\pm$, denoted by $\langle Q \rangle$ is proportional to the rate of token generation $\rho$:

$$\langle Q_\pm \rangle = t_c \rho_\pm$$

Thus, $\rho_\pm$ can be approximated at time t by $Q_\pm(t)/t_c$. In fact, the function $Q_\pm(t)$ is the moving average of $r_0^{(in)}(t)$ appearing in equation (1).

In summary, the joint operation of the AP block 340, HC block 330 and the NRC block 340 functionalities provide a flexible method to accept NRs, evaluate handovers and through them the corresponding NRs in an automated way. The AP block 340 uses a sophisticated algorithm that not only counts the demand for a new NR but also may be capable of taking into account the type of users that generate the demand. The HC block 330 and NRC block 340 continuously and efficiently evaluate existing NRs by classifying corresponding handovers and, based on the evaluation, modify the NR attributes and/or notify the operator by an ALARM notification. Therefore, the invention provides an admission method for ANR functionality. It may also provide attribute setting of already established NRs. This may involve a handover classification method to determine if a handover is normal or abnormal and, when a sufficient quantity of statistics has been collected, suitable reconfiguration of the problematic NRs may be carried out.

While preferred embodiments of the invention have been shown and described, it will be understood that such embodiments are described by way of example only. For example, because the functionality of the AP block 310 can be seen to be independent of the functionality of the NRC block 340, either functionality may be applied to an ANR without the other. The tokens added to the leaky buckets of the AP block 310 and/or the NRC 340 may be integers or may have a fractional/decimal component with or without an integer component as desired. Numerous variations, changes and substitutions will occur to those skilled in the art without departing from the scope of the present invention. Accordingly, it is intended that the following claims cover all such variations or equivalents as fall within the spirit and the scope of the invention.

The invention claimed is:

1. A method of managing neighbour relations between cells comprising the steps of:
   receiving requests for admission of a neighbour relation;
   adding tokens in respect of each request;
   removing tokens as time passes; and
   admitting the neighbour relation if the number of tokens passes a threshold,
   wherein in an additional assessment to decide to admit the neighbour relation, criteria are evaluated relating to negative impacts on cells with a normal frequency of handovers due to cells with increased handover frequency that share the same transport network resources with the cells that have a normal frequency of handovers,
   wherein the negative impacts to be evaluated in the additional assessment relate to a measured average end-to-end delay, a number of hops, or a cumulative cost comprising weights of intermediate links between the cells,
   wherein receipt of a measurement report identifying a cell for which a neighbour relation has not been established leads to adding predefined numbers of tokens in respect of that cell, and
   wherein the number of tokens added following handling of a measurement report reflects a weight given to the source of the measurement report based on properties of a reporting terminal or a subscriber who owns the terminal.

2. A method according to claim 1 which is applied in an admission policy block.

3. A method according to claim 1 in which tokens are added to and removed from a leaky bucket maintained separately for each neighbour relation candidate.

4. A method according to claim 1 in which the additional assessment criteria are evaluated relating to the neighbor relation being between a macro and a micro/pico cell.

5. A method according to claim 1 in which the method comprises classifying handovers associated with a neighbour relation between cells into classifications of a first type and classifications of a second type.

6. A method according to claim 5 comprising:
   classifying handovers associated with a neighbour relation between cells into classifications of a first type and classifications of a second type;
   adding tokens in respect of the classifications of the first type to create a first sum of tokens, removing tokens from the first sum of tokens as time passes, and monitoring the sum of tokens with respect to a first threshold;
   adding tokens in respect of the classifications of the second type to create a second sum of tokens, removing tokens from the second sum of tokens as time passes, and monitoring the sum of tokens with respect to a second threshold; and
   determining a state of the neighbour relation according to the relative levels of the first and second sums of tokens and their respective thresholds.

7. A method according to claim 6 in which incoming handovers are classified based on comparing an actual period of occupancy in a cell with a minimum period.

8. A method according to claim 6 in which, as a result of determining a particular state of a neighbour relation, the neighbour relation is modified in a base station other than the one in which the method is carried out.

9. A communication system comprising a plurality of nodes, the nodes being capable of managing neighbour relations between cells and each comprising:
   an input capable of receiving requests for admission of a neighbour relation; and
   an admission management block capable of adding tokens in respect of each request and removing tokens as time passes, the admission management block admitting the neighbour relation if the number of tokens passes a threshold,
   wherein in an additional assessment to decide to admit the neighbor relation, criteria are evaluated relating to negative impacts on cells with a normal frequency of handovers due to cells with increased handover frequency that share the same transport network resources with the cells that have a normal frequency of handovers,
   wherein the negative impacts to be evaluated in the additional assessment relate to a measured average end-to-end delay, a number of hops, or a cumulative cost comprising weights of intermediate links between the cells,
   wherein receipt of a measurement report identifying a cell for which a neighbour relation has not been established leads to adding predefined numbers of tokens in respect of that cell, and
   wherein the number of tokens added following handling of a measurement report reflects a weight given to the source of the measurement report based on properties of a reporting terminal or a subscriber who owns the terminal.

10. A node capable of managing neighbour relations between cells comprising:
   an input capable of receiving requests for admission of a neighbour relation; and
   an admission management block capable of adding tokens in respect of each request and removing tokens as time passes, the admission management block admitting the neighbour relation if the number of tokens passes a threshold,
   wherein in an additional assessment to decide to admit the neighbour relation, criteria are evaluated relating to negative impacts on cells with a normal frequency of handovers due to cells with increased handover frequency that share the same transport network resources with the cells that have a normal frequency of handovers,
   wherein the negative impacts to be evaluated in the additional assessment relate to a measured average end-to-end delay, a number of hops, or a cumulative cost comprising weights of intermediate links between the cells,
   wherein receipt of a measurement report identifying a cell for which a neighbour relation has not been established leads to adding predefined numbers of tokens in respect of that cell, and
   wherein the number of tokens added following handling of a measurement report reflects a weight given to the source of the measurement report based on properties of a reporting terminal or a subscriber who owns the terminal.

11. A computer program, embodied on a non-transitory computer readable medium, the computer program, when executed by a processor, causes the processor to perform a method of managing neighbour relations between cells comprising the steps of:
   receiving requests for admission of a neighbour relation;
   adding tokens in respect of each request;
   removing tokens as time passes; and
   admitting the neighbour relation if the number of tokens passes a threshold,
   wherein in an additional assessment to decide to admit the neighbour relation, criteria are evaluated relating to negative impacts on cells with a normal frequency of handovers due to cells with increased handover frequency that share the same transport network resources with the cells that have a normal frequency of handovers,
   wherein the negative impacts to be evaluated in the additional assessment relate to a measured average end-to-end delay, a number of hops, or a cumulative cost comprising weights of intermediate links between the cells,
   wherein receipt of a measurement report identifying a cell for which a neighbour relation has not been established leads to adding predefined numbers of tokens in respect of that cell, and
   wherein the number of tokens added following handling of a measurement report reflects a weight given to the source of the measurement report based on properties of a reporting terminal or a subscriber who owns the terminal.

* * * * *